UNITED STATES PATENT OFFICE 2,347,260

PEST CONTROL

Hubert G. Guy and Avery H. Goddin, Newark, Del., assignors to E. I. du Pont de Nemours & Company, Wilmington, Del., a corporation of Delaware No Drawing. Application August 1, 1940, Serial No. 349,248

3 Claims. (Cl. 167—22)

This invention relates to pest control and is particularly directed to new and improved fly sprays containing pyrethrins, isobutylundecylenamide and octyl thiocyanate.

The quality and effectiveness as a fly spray is determined first by its ability to knock down the flies and, second, by its ability to kill. The first, known as paralytic, is determined in the standard Peet Grady test as the number of flies permanently down after ten minutes, and the second, known as the lethal effect, is determined as the percentage of paralyzed flies which are dead at the end of twenty-four hours. Poisons vary in the relative intensity of these two effects and pyrethrum, which has been adopted for a standard of comparison, has exceptionally high paralytic properties and fairly good lethal properties.

Other desirable attributes of fly sprays, including low toxicity to humans and higher animals, so characterize pyrethrum that, notwithstanding its high cost and dependency on foreign markets, it has not yet been wholly displaced by synthetic poisons. In recent years N-isobutylundecylenamide has been used widely to replace much of the pyrethrum in fly sprays. Organic thiocyanates also are of value, but the difficulty with organic thiocyanates is that excessively high concentrations are required to obtain the desired paralytic and lethal effects.

We have now found that the amount of pyrethrum in fly sprays can be still further displaced by the use of N-isobutylundecylenamide and octyl thiocyanate in combination therewith.

The essential feature of our invention lies in the combination in a fly spray containing pyrethrum and N-isobutylundecylenamide of octyl thiocyanate which is predominantly paralytic in its action. The N-isobutylundecylenamide is activated by pyrethrum so that an effective fly spray may be prepared using substantially less of pyrethrum than in the standard pyrethrum fly sprays. While the octyl thiocyanate does not similarly activate the N-isobutylundecylenamide yet we have found that a substantial proportion of the pyrethrum required so to activate the amide may be replaced by octyl thiocyanate.

Suitable compositions and comparative results are illustrated in the table, the fly spray base being a proprietary deodorized kerosene.

Table

| Materials and concentration | | | Per cent paralyzed | Per cent dead |
|---|---|---|---|---|
| N-isobutyl-undecylen-amide, gms.[1] | Pyrethrum, mgs.[1] | Octylthio-cyanate, cc.[1] | | |
| 0.42 | 15 | 0.5 | 84 | 42 |
| 0.35 | 20 | 0.5 | 88 | 42 |
| 0.42 | 20 | 0.25 | 86 | 40 |
| 0.42 | 20 | 0.5 | 89 [3] *91* | 55 *69* |
| Official test insecticide | | | 64 | 21 |
| 0.42 | 40 | -------- | 87 *88* | 41 *59* |
| -------- | 40 | 1.0 | 95 | 24 |
| 0.42 | -------- | 1.0 | [2] 80 | 0 |

[1] Per 100 cc. of spray.
[2] 80 affected but only 2% completely paralyzed.
[3] The data in italics were taken with a different and apparently less resistant culture of flies. Hence comparison must be made with reference to the two sprays which were included in both series of tests.

The synergistic action of the components in the three component sprays is clearly shown in the above table. The sprays containing the three components are superior on a cost-efficiency basis to sprays obtainable by any other combination of the three components.

It will be understood that the effectiveness of the spray may be enhanced by increasing the concentration of any one or any combination of the three ingredients. An example of this is shown in the third and fourth compositions listed in the table. An increase in the concentration of octyl thiocyanate from 0.25 to 0.5 gives an increased kill from 40 to 55. This increase in kill is particularly significant since octyl thiocyanate alone in concentrations which give practically 100 per cent paralysis is practically non-lethal, giving at most but a few per cent kill. Another example may be seen in the second and fourth compositions listed. An increase from 0.35 gram N-isobutylundecylenamide to 0.42 gram resulted in a corresponding increase in kill from 42 to 55. The pyrethrum content likewise may be varied, but inasmuch as it is desired to displace as much pyrethrum as possible it is preferable that the pyrethrum content be maintained less than 25 milligrams per 100 cc. and the content of the other two active ingredients adjusted as required to give a fly spray having the desired paralytic and lethal effects. If the concentration of pyrethrum is too low the improvement is not significant. It is preferable that the pyrethrum content be not less than about ten milligrams per 100 cc.

The concentrations given are based on grade AA fly sprays. Usually a concentrate is prepared which when diluted with a suitable fly spray base at 1—19 will yield such a fly spray. It is customary to dilute such concentrates more or less, depending upon whether grade AA, grade A, or grade B fly sprays are desired. It is difficult therefore to specify particularly any percentage composition. In general, however, the most suitable compositions are obtained when the three ingredients are blended in the fly spray base in the proportions of 0.35 to 0.45 gram of N-isobutylundecylenamide, 15 to 25 milligrams of pyrethrum, and 0.2 to 0.5 cc. of the thiocyanate.

We claim:
1. A composition of matter composed as a fly spray and containing N-isobutylundecylenamide, pyrethrum and n-octyl thiocyanate, the amount of pyrethrum being sufficient to provide from about 10 to 100 milligrams of pyrethrum per 100 cc. of fly spray.

2. A composition of matter composed as a fly spray and containing N-isobutylundecylenamide, pyrethrum and n-octyl thiocyanate, the amount of pyrethrum being 15 to 25 milligrams per 100 cc.

3. A composition of matter composed as a fly spray and containing N-isobutylundecylenamide, pyrethrum and n-octyl thiocyanate in the proportions of 350 to 450 milligrams N-isobutylundecylenamide, 15 to 25 milligrams pyrethrum, and 0.2 to 0.5 cc. octyl thiocyanate.

HUBERT G. GUY.
AVERY H. GODDIN.